G. L. HARVEY.
WHEEL ATTACHMENT.
APPLICATION FILED JAN. 29, 1919.
1,304,478.
Patented May 20, 1919.
2 SHEETS—SHEET 1.
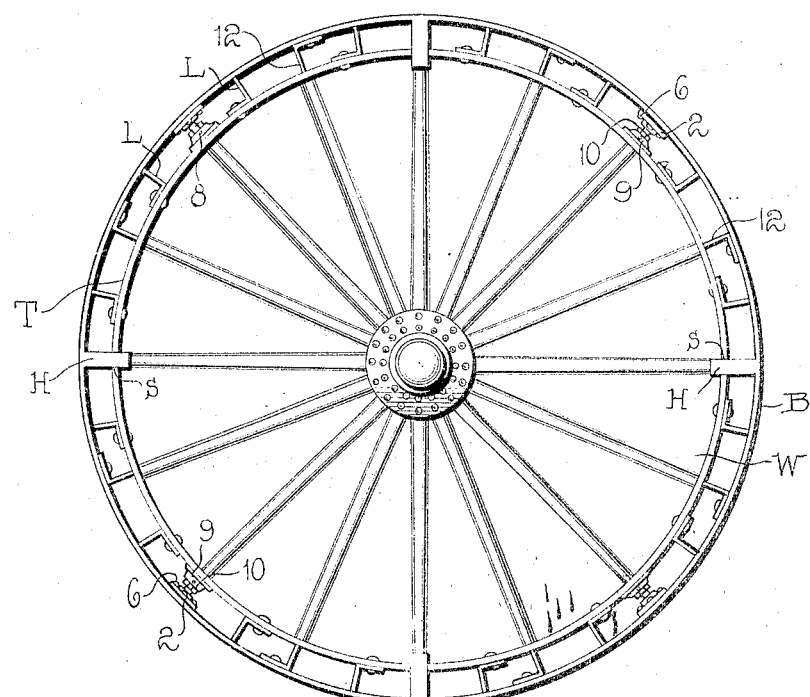
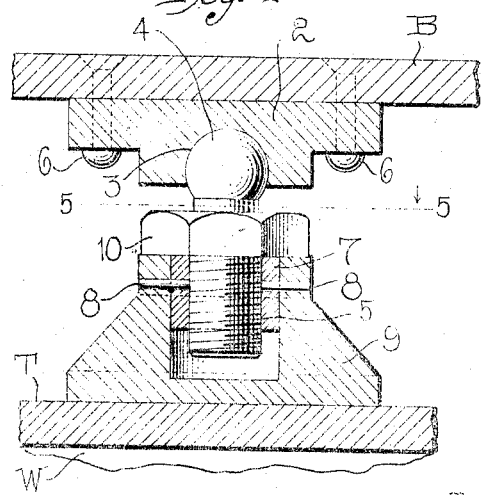
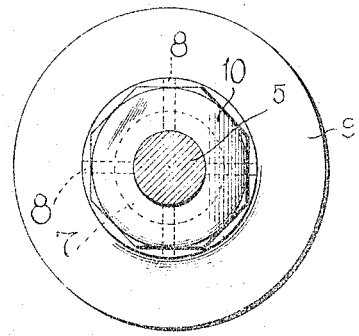
Inventor:
George L. Harvey.
By
Wm Fletcher & Co., Attorneys

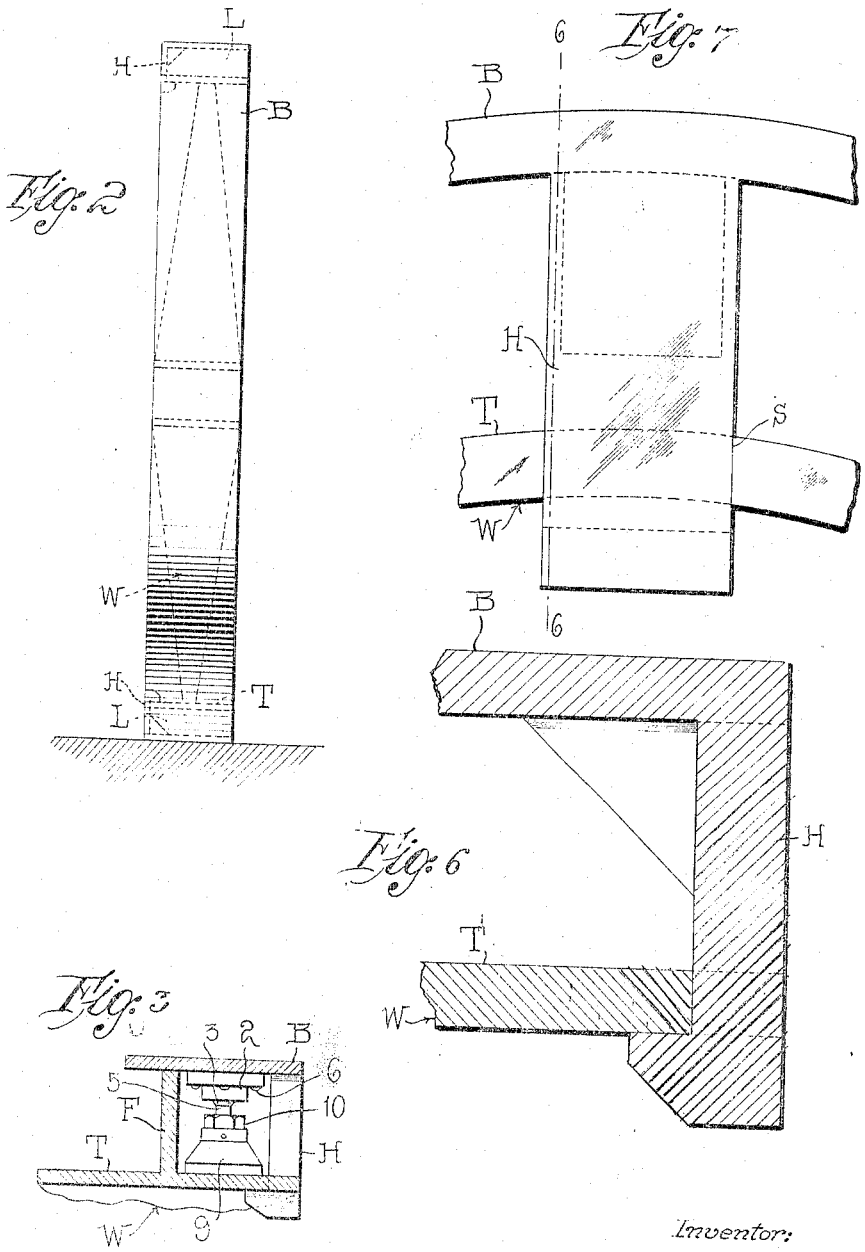

UNITED STATES PATENT OFFICE.

GEORGE LOCKWOOD HARVEY, OF PORT HURON, MICHIGAN.

WHEEL ATTACHMENT.

1,304,478.    Specification of Letters Patent.    Patented May 20, 1919.

Application filed January 29, 1919. Serial No. 273,892.

*To all whom it may concern:*

Be it known that I, GEORGE L. HARVEY, a citizen of the United States, residing at Port Huron, in the county of Saint Clair and State of Michigan, have invented certain new and useful Improvements in Wheel Attachments; and I do hereby declare the following to be a full, clear, and exact description of the invention, such as will enable others skilled in the art to which it appertains to make and use the same.

This invention relates to wheels and more particularly to wheels of the type having traction members or grousers on their tires to increase the tractive effect of the power plant of the vehicle, such for instance as traction engines or other heavy structures.

It is one of the objects of the present invention to provide a readily demountable and readily attached rim to be used in combination with traction wheels having grouser members on their tires, and it is also an object of the invention to provide a demountable rim which has a smooth periphery or tread surface for the protection of roads or paving so as to reduce the destructive effect of the vehicle when traveling over the roads or pavements. It is another object of the invention to provide in a device of this type a rim structure which may be applied readily to different types of grouser wheels and also to wheels of different sizes.

A further object of the invention is to provide for the ready renewal of the various parts of the tire or rim and to provide parts which are relatively interchangeable and which are substantial, durable and of an inexpensive character.

With these and other objects in view as will be rendered manifest to those skilled in the art, the invention consists of the construction, the combination, and in details and arrangement of the parts as more particularly described in the following specification with relation to the embodiment of the invention as illustrated in the accompanying drawing, wherein, Figure 1 is a side elevation of a traction wheel having transverse grousers which are encompassed by the auxiliary or supplemental rim.

Fig. 2 is a face view of the wheel shown in Fig. 1.

Fig. 3 is a detail of the adaptation of the improved rim to another form of traction wheel than that shown in Fig. 1.

Fig. 4 is an enlarged detail sectional view of one of the fastening devices.

Fig. 5 is a plan view of the same.

Fig. 6 is a sectional view through the wheel flange and the supplemental flange and illustrating the interlocking means, and Fig. 7 is a side view of the part shown in Fig. 6.

Heavy traction vehicles are usually provided with wheels, one of which is indicated in Fig. 1 at W, which are provided with suitable grousers or lugs on their peripheral or tread surface, as indicated at L, to increase the tractive effect of the wheel and wheels of this type do a very considerable and material damage to roadways and pavements over which they may be caused to travel and a feature of the present invention consists in the provision of a supplemental or auxiliary tire or band adapted to be readily attached to the usual or given form of traction wheel for encompassing the grousers and therefore preventing the same from injuring the roadway or pavement over which they may be operating.

In the illustrated embodiment of my invention I have shown a band preferably of endless construction indicated at B which is of such an internal diameter as being capable of being slid transversely over the grousers L on the wheel to be fitted and for the purpose of preventing transverse movement beyond a given point in the adjustment of the band B the same is provided with means adapted to interlock with the tire T of the wheel and in the illustrated embodiment the interlocking means comprises radially disposed hooks H, the nibs of which are designed to pass beneath the inner surface of the tire T while the shanks of the hooks are preferably engaged in seats S made in the side of the tire T to receive the hooks and therefore prevents the circumferential movement of the band about the tire teeth.

For the purpose of enabling the ready attachment and detachment of the device and yet for securely holding the supplemental tire or rim in assembled position upon the usual tire or rim I prefer to secure to the supplemental band a socket piece 2 having a spherical socket or chamber 3 to receive the complementary end 4 of a threaded shank 5. The socket piece 2 may be secured to the band B in any suitable manner, as for instance by the series of rivets 6. The threaded end of the shank or bolt 5 is designed to engage a threaded complementary part or nut 7, rigidly secured to, as for instance, by pins 8, a base 9 designed to be passed readily over the outer surface of the tire T, when the base 9 has been screwed radially outward toward the band B on the threaded parts of all the shanks 5.

In the application of the auxiliary band adjusted as suggested the bases of the several attaching devices are adjusted outwardly so as to be passed freely over the tire T and the band B is then positioned over the tire until the interlocking hooks H properly engage in their seats S after which, by application of a simple tool to the flattened or polygonal part 10 of the bolt, the base or bases 9 is or are shifted inwardly toward the tire T until securely resting thereon.

To aid in sustaining the band B in a circular position there may be provided in addition to the supporting and adjustable devices 5, a series of shims or spacers shown as comprising pieces of angle-iron 12 having one of their flanges secured to the band B and the edge of the other flange resting on the circumference of the usual tire T these spacers being interposed alternately between the grousers where necessary.

In Fig. 3 the supplemental tire or band is shown as adapted to a type of grouser wheel W having a central flange F.

From the above it will be seen that I have provided a supplemental rim or band which may be quickly attached to a given traction wheel simply by the application of an ordinary tool in the form of a wrench enabling the adjustment of the nut 10 to put the bases 9 against the tire T, the application of the band being made while the axle is jacked up.

I claim:

1. The combination with a wheel having grousers on its tire, of an endless band with a smooth tread surface; means for interlocking the band to the tire against transverse and circumferential play; and radially acting fastening means attached to the band, adapted for adjustment against the tire.

2. The combination with a wheel having grousers on its tire, of an endless band with a smooth tread surface; means for interlocking the band to the tire against transverse and circumferential play; and radially acting fastening means attached to the band, adapted for adjustment against the tire, the interlocking means acting in opposition to the fastening means.

3. The combination with a wheel having grousers on its tire, of an endless band with a smooth tread surface; means for interlocking the band to the tire against transverse and circumferential play; and radially acting fastening means attached to the band, adapted for adjustment against the tire, the fastening means including a socket attached to the band, a threaded shank with its head seated in the socket and having a flattened part to be engaged by a tool for turning the bolt, and a treaded base to receive said part and adapted to be slipped over the tire with the band and then set against the tire.

4. The combination with a wheel having grousers on its tire, of an endless band with a smooth tread surface; means for interlocking the band to the tire against transverse and circumferential play, and radially acting fastening means attached to the band, adapted for adjustment against the tire, the interlocking means comprising a series of radial hooks on the band insertible in seats therefor on the side of the tire.

5. The combination with a wheel having grousers on its tire, of an endless band with a smooth tread surface; means for interlocking the band to the tire against transverse and circumferential play; and radially acting fastenig means attached to the band, adapted for adjustment against the tire, and spacers interposed between the tire and band and intermediately of certain of the grousers.

In testimony whereof I affix my signature in presence of two witnesses.

GEORGE LOCKWOOD HARVEY.

Witnesses:
BERT D. CASBY,
MARY A. WAITE.